United States Patent Office 3,162,262
Patented Dec. 22, 1964

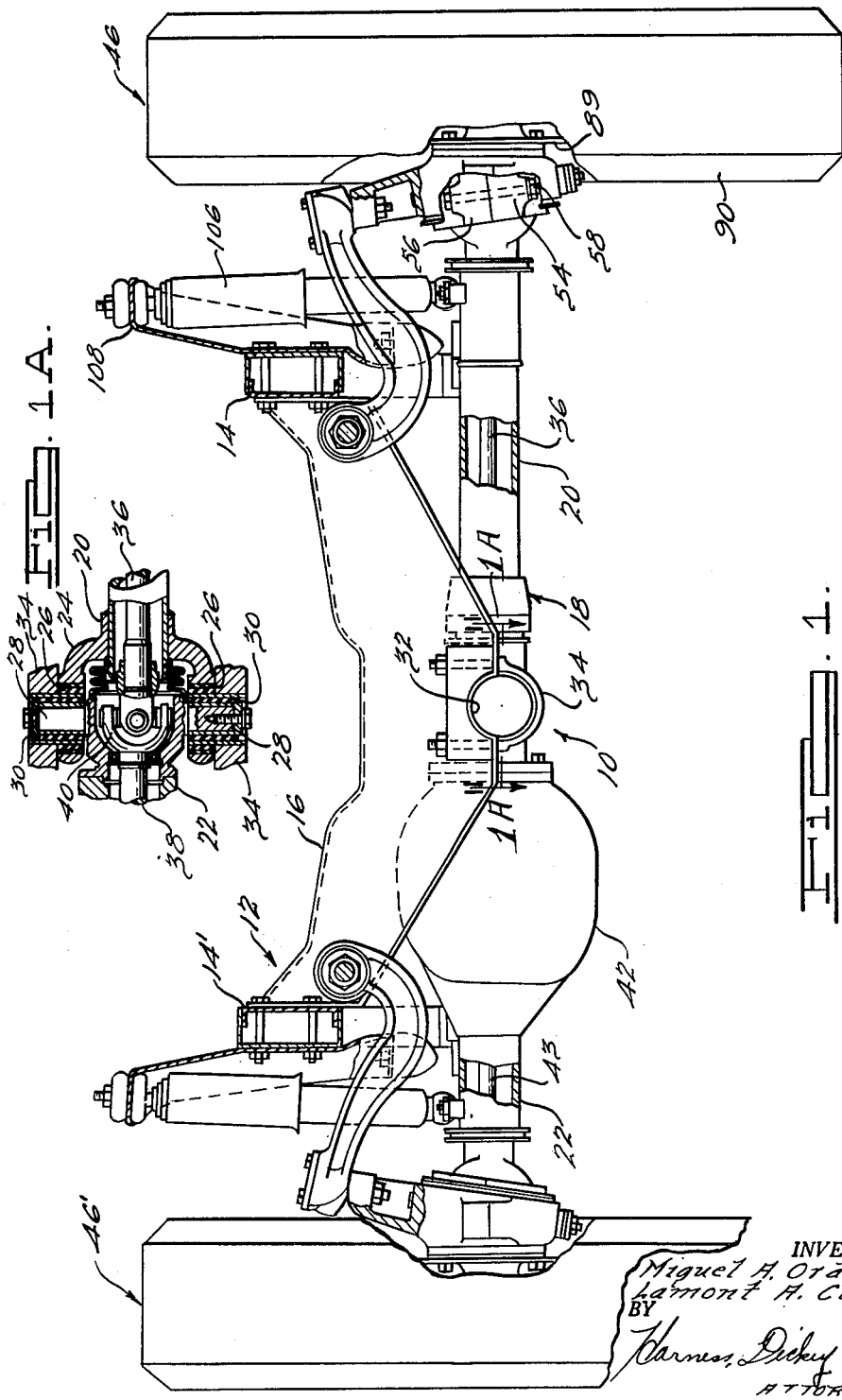

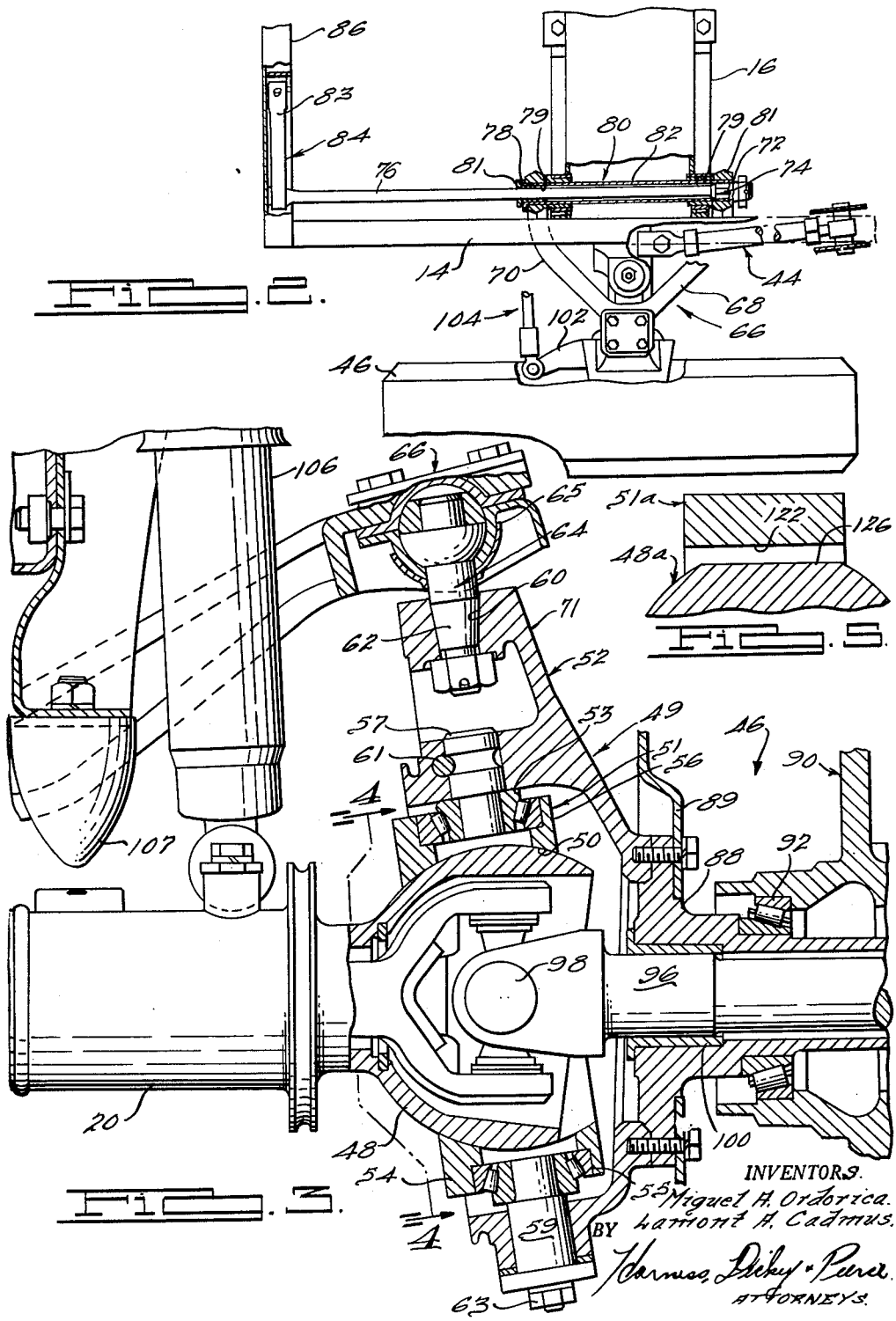

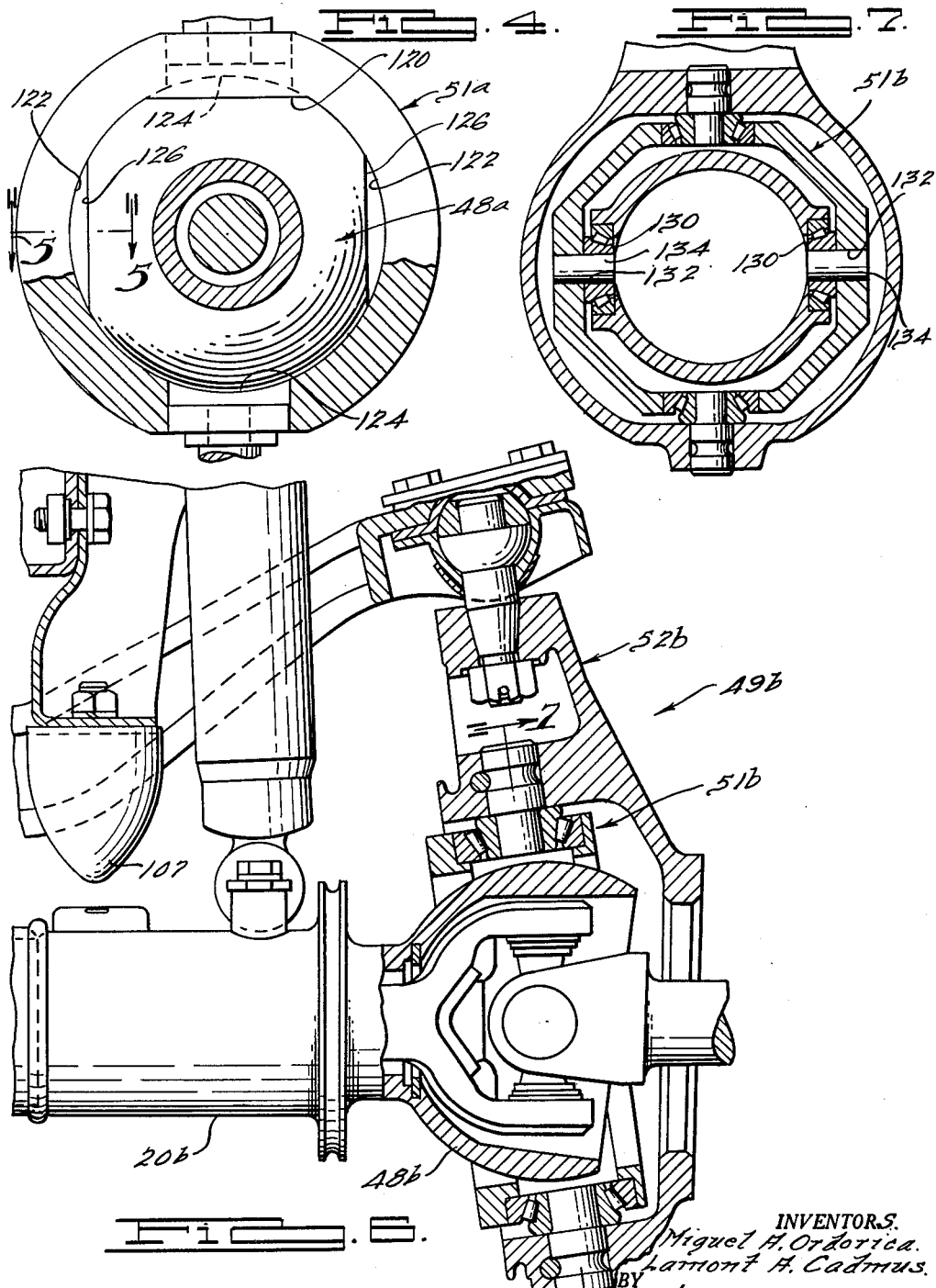

3,162,262
SUSPENSION FOR STEERABLE AND DRIVEN WHEELS
Miguel A. Ordorica, Lambertville, Mich., and Lamont A. Cadmus, Toledo, Ohio, assignors to Willys Motors, Inc., Toledo, Ohio, a corporation of Pennsylvania
Filed Mar. 12, 1962, Ser. No. 178,813
16 Claims. (Cl. 180—43)

This invention relates to vehicle suspensions and more particularly to an independent suspension for an automotive vehicle.

The features of this invention are depicted and described as being embodied in the front suspension of a four-wheel drive vehicle; it should be understood, however, that these features are not restricted in application or utility to that particular type of vehicle but are also applicable to a rear suspension, to a two- or four-wheel drive vehicle with two or four-wheel steering and to any combinations thereof. It has been a common practice that four-wheel drive vehicles be designed to have a front suspension including a solid front axle instead of an independent type suspension found in conventional vehicles; with such a solid front axle design, the dynamic loads on one wheel are, in part at least, transferred to the other wheel. In the case of an independent front suspension, each of the front wheels is capable of moving independently of the other and hence can be independently subjected to dynamic loads. In comparing a vehicle with a solid front axle and a vehicle with an independent front suspension, the ride and handling characteristics, including steering, are superior for the vehicle with the independent front suspension. In view of the above, it is an object of this invention to provide an independent front suspension for a four-wheel drive vehicle which has improved ride and handling characteristics.

With vehicles to be used for off-the-road purposes, it is desirable that the center of gravity of the vehicle be near the ground to provide for greater stability. One factor limiting the degree to which the height of the vehicle and, hence, the center of gravity can be lowered, is the physical location of the suspension components of the vehicle relative to the ground. It is another object of this invention to provide a modified suspension design facilitating the lowering of the vehicle chassis and, hence, the lowering of the center of gravity.

Another factor determinative of the stability of the vehicle is the location of the roll center of the front suspension; by locating the roll center of the front suspension at a point closer to the center of gravity, the resultant moment of the center of gravity of the vehicle about the roll center is decreased, hence increasing the stability of the vehicle in roll. Ordinarily, raising the roll center results in an increase in tire scrub causing excessive tire wear. It is still another object of this invention to provide an independent front suspension construction having a high roll center and in which the resultant scrub is minimized.

With an independent suspension system for wheels which are powered to drive the vehicle, it is a common practice that a pair of universal joints be required for the axles and a pair of pivot joints be required for the associated control arms. This is done in order that each wheel swing independently of the other. It is also common practice that the pivot points of the control arm for the powered wheels be located at a different point from the pivot point of the axle shafts energizing the powered wheels, thereby necessitating the use of a slip joint in the axle shaft. It is an object of this invention then to provide an independent suspension in which a single universal joint for the axle shafts and a single pivot joint for the control arms are used and in which the pivot point for the axle shafts is coincident with the pivot point of the control arms, thereby obviating the need for slip joints in the axle shafts.

One problem in suspension design for steerable wheels is excessive friction in the steering system. This frictional effect usually becomes even more pronounced when the wheels are subjected to high jounce and rebound loads. It is an object of this invention to provide a front suspension in which the friction in the steering system has been minimized.

Other objects, features and advantages of the present invention will become apparent from the subsequent description and the appended claims taken in conjunction with the accompanying drawings in which:

FIGURE 1 is a front elevational view of a suspension system embodying the features of this invention in which some of the components are shown partially broken away and partially in section and in which the suspension is shown in conjunction with a portion of a vehicle chassis;

FIGURE 1A is a fragmentary sectional view of the suspension of FIGURE 1 taken substantially along the line 1A—1A;

FIGURE 2 is a top elevational view of a suspension system shown in FIGURE 1 with some of the components partially broken away and some partially in sections;

FIGURE 3 is a blown-up view with some parts in section and some parts broken away of a portion of the suspension system of FIGURE 1;

FIGURE 4 is a fragmentary sectional view with some parts broken away of a modification of the apparatus shown in FIGURE 3 as would be viewed substantially along the line 4—4 of FIGURE 3 if that apparatus were so modified;

FIGURE 5 is a sectional view with some parts shown broken away and some parts shown in section of the apparatus shown in FIGURE 4, taken substantially along the line 5—5;

FIGURE 6 is a view of a modification of the apparatus shown in FIGURE 3 with some parts shown broken away and some parts shown in section;

FIGURE 7 is a sectional view of the modified design of FIGURE 6 taken substantially along the line 7—7.

In general, looking now to FIGURE 1 an independent front suspension is shown having means whereby the front wheels of the vehicle are drivable by a power plant and associated drive line (not shown) in conjunction with a conventional rear wheel drive (not shown) to drive the vehicle chassis (shown in part). With the suspension system shown in FIGURE 1, the axle housings, in which the axle drive shafts by which the wheels are powered are rotatably housed, are also used as the lower control arms of the front wheels. Contrary to a solid front axle design, the axle housing shown in FIGURE 1 is made in two parts which are pivotally interconnected by a single centrally located pivot joint. Since in some types of independent suspension design separate pivot joints are required for each lower control, the use of a single pivot joint results in a simplification of design and hence in a cost savings. Note that by providing a centrally located pivot joint, the lower control arm of maximum length for that vehicle is provided thereby facilitating a reduction in the amount of scrub on the tires as the tires traverse through maximum jounce and rebound positions. By so minimizing the amount of scrub, the roll center of the vehicle can be raised nearer the center of gravity to thereby increase the stability in roll while still maintaining the amount of scrub at a commercially acceptable level.

The axle shafts in turn have a single universal joint connection in order to facilitate a swinging movement along with the rotational movement incident to power transfer. In the design of FIGURE 1 the single centrally located pivot joint of the axle housings has its pivotal axis coincident with that of the universal joint associated with the axle shafts. By thus locating the pivotal axes of the universal joints and of the axle housing portions, no slip joints in the axle shafts are required and hence an economy is realized. Note that by using the portions of the axle housing as the lower control arms, the vehicle can be designed with more ground clearance since if lower control arms were provided which were independent of the axle housings they would necessarily be located below the axle housing.

With this general background in mind, the more specific details of the construction of an independent front suspension, embodying the features of the present invention, are described. In the description to follow, similar components on opposite sides of the vehicle which serve similar functions and have similar constructions are designated by the same primed numbers. More specifically, an independent front suspension for a four wheel or front wheel drive vehicle is generally designated by the numeral 10 and is to be connected to a vehicle chassis, a portion of which is shown and generally indicated by the numeral 12. While the suspension system 10 is described with a vehicle of a frame type construction, it is understood that the suspension system of this invention would be equally usable with a chassis of a unitized or other type construction. The chassis 12 comprises a pair of longitudinally extending side rails 14, 14' which are forwardly interconnected by a forwardly located, transversely extending cross member 16. An axle assembly generally designated by the numeral 18 comprises a pair of axle housing members 20 and 22 interconnected to pivot about a pivotal axis centrally located with respect to the axle assembly 18. The axle assembly 18 is connected to the cross member 16 at its pivotal axis at a point located centrally of that cross member and, hence, centrally of the width of the vehicle.

Looking now to FIGURE 1A, the axle housing member 20 terminates at its innermost end in a yoke portion 24 having a pair of in line bores 26; the axle housing 22 terminates at its innermost end in a pair of outwardly extending ears 28 which are pivotably secured within the aligned bores 26 by means of a pair of silent block assemblies 30 which are of a construction well known in the art and are not described in detail herein. The axle assembly 18 is secured to the cross member 16 at a centrally located semicircular portion 32 by means of a pair of brackets 34. As can best be seen in FIGURE 1A, the brackets 34 grip the silent block assemblies 30 and maintain them fixed relative to the cross member 16 such that both axle housing members 20 and 22 are free to pivot independently of each other. In this manner then, the axle housing members 20 and 22 are independently pivotable about an axis centrally located with respect to the width of the vehicle.

Looking now to FIGURES 1 and 1A, the axle housing member 20 has an axle shaft 36 rotatably disposed therein and axle housing member 22 has an axle shaft 38 similarly rotatably disposed. Axle shafts 36 and 38 are connected by a universal joint assembly 40 which has its pivotal axis located in coincidence with the pivotal axis of the axle housing members 20 and 22. With such coincidence of axes and by using the axle housings 20 and 22 as lower control arms (in a manner to be described), it is not required that the axle shafts 36 and 38 undergo a change in length during the swinging or pivoting motion of the axle housing portions (20, 22) through jounce and rebound; thus, the need for a slip joint in the axle shafts 36 and 38 is obviated. Another advantage in using a single pivot joint having its axis disposed centrally transversely of the vehicle is that the length of the lower control arms (axle housing members 20, 22) are of the maximum length allowable with any particular type vehicle thus facilitating a reduction in tire scrub.

The universal joint assembly 40 can be either the conventional cross type or the constant velocity type; in the preferred embodiment, the less expensive cross type joint can be used since the pivotable angular variations are small at this joint and hence the rotational speed fluctuations are negligible.

The axle shaft 36 is interconnected at its outer end with one of a pair of wheel assemblies 46, for transmitting driving power thereto in a manner to be described. The axle shaft 38 is connected at its outermost end to one side of a differential assembly 42, the specific construction of which is conventional and does not constitute a part of this invention. An axle shaft 43 similar to axle shaft 36 is rotatably disposed in the outer portion of the housing member 22, and is connected from the other side of the differential assembly 42 to the other one of the pair of wheel assemblies 46' for transmitting driving power thereto. The specific means for power transfer from a power plant (not shown) associated with the vehicle via a drive shaft (not shown) to the differential assembly 42 and thence to the associated axle shafts is well known in the art and is thus not described herein in detail. Thus power is delivered to one of the wheel assemblies 46 via the differential assembly 42, the axle shaft 38, universal joint 40 and axle shaft 36. The power to the other of the wheel assemblies 46' is delivered via the other side of the differential assembly 42 to axle shaft 43. No universal joint is needed between the differential assembly 42 and the shaft 43.

A strut assembly 44 (FIGURE 2) is pivotally secured at one end to a bracket outwardly disposed on the axle assembly 18 and is pivotally secured at the other end to a bracket located on the side rail 14. A similar strut assembly (not shown) is pivotally connected from the other side of the axle assembly 18 to the side rail 14'. The strut assemblies react brake loads and other horizontal loads applied to the axle assembly 18 via the wheel assemblies 46, 46'.

Looking now to FIGURE 3, the axle housing member 20 terminates at its outer extremity in a ball portion 48 which has a steering knuckle assembly 49 pivotally disposed thereon by means of a spherically contoured socket 50 in an intermediate socket or ring member 51. The socket 50 is defined by a pair of spherically contoured cavities in a lower member 54 and an upper member 56 of the socket member 51 which are secured together by a pair of studs 58 (see FIGURE 1). With the ball and socket arrangement as described, the socket member 51 is free to move frictionally over the ball portion 48 at the outer extremity of the axle housing member 20 to facilitate vertical movement of the lower control arm (axle housing member 20) and the associated wheel assembly 46. Fixedly secured within vertically oppositely disposed apertures in the assembled socket member 51, are the outer races of upper and lower bearings 53 and 55. A one-piece steering knuckle member 52 has an enlarged cavity of a size large enough to accept the socket member 51 and the ball portion 48. Upper and lower pin members 57 and 59, respectively, are disposed in upper and lower axially aligned bores which are in turn in axial alignment with the upper and lower bearings 53 and 55 respectively. The upper and lower pin members 57 and 59 have reduced diameter portions which are engageable with the inner races of the upper and lower bearings 53 and 55, respectively, and hence are rotatable with respect to the fixed outer races. The pin member 57 is axially restrained within the upper bore in the steering knuckle member 52 by means of a dowel pin 61 which is matably disposed within an aperture defined by a portion of an annular groove in the pin member 57 and a bore extending through the steering knuckle member 52 and partially transversely intersecting the upper bore. The lower pin member 59 is axially restrained by means of a nut 63 which is threaded upon a threaded extension of the pin member 59. The pin members 57 and 59 preferably have their reduced diameter portions secured within the inner races of the bearings 53 and 55, respectively, by means of a press fit. In the arrangement as shown in FIGURE 3, it can be seen that the steering knuckle member 52 can rotate relatively easily about a substantially vertical axis running through the upper and lower pin members 57 and 59 via the upper and lower bearings or anti-friction means 53 and 55. Thus it can be seen that the frictional forces in steering are reduced by means of the bearings. The rotation of the steering knuckle member 52 about a substantially horizontal axis in response to jounce and rebound movement of its corresponding wheel assembly occurs by means of the frictional joint between the socket member 51 and the spherically shaped ball portion 48.

A vertically extending portion of the upper arm member 71 of the steering knuckle member 52 terminates in a portion having a tapered bore 60 into which a tapered stud 62 of a ball joint assembly 64 is secured by conventional means. A socket portion 65 of the ball joint assembly 64 is secured to the outer end of an upper control arm assembly 66 which has a pair of arms 68 and 70 (see FIGURE 2) which are spaced apart sufficiently to straddle the cross member 16. The arms 68, 70 are provided with a pair of in line bores 72 and 73 respectively, which, when the control arm 68 is properly disposed relative to the cross member 16 are in alignment with a pair of bores 79 through the cross member 16. A pair of bushings 81 are located in bores 79 and a sleeve assembly 80 has a longitudinally extending sleeve portion 82 disposed in the bores 79, the cross member 16, and in the bores 72 and 73 in the upper control arm 66. A torsion bar 76 passes through one end of the sleeve 80 and has a multi-faced head 74 in engagement with a similarly faced internal portion on the end of the sleeve member 80; in a like manner, the sleeve member 82 is keyed or secured to the upper control arm 66 at the bores 72 and 73. Thus pivoting of the upper control arm 66 in the bushings 81 via the sleeve member 82 causes the torsional rotation of the torsion bar 76.

The other end of the torsion bar 76 is connected or keyed to a torsion bar anchor 83 of a height adjustment assembly 84. The torsion bar height assembly 84 is disposed in a front cross member 86 secured between the side rails 14, 14'. The anchor 83 is pivotable about the axis of the torsion bar 76 and thus provides means for adjusting the torsion in that bar. The torsional load exerted upon the torsion bar 76 by the upper control arm 66 as a result of the load on the wheel assembly 46 is reacted in the front cross member 86 through the height adjustment assembly 84.

Looking now to FIGURE 3 in the steering knuckle assembly 49, the steering knuckle member 52 has fixedly secured to it a brake backing plate 89 and a hollow spindle portion 88 which has a pair of bearings 92 (only one shown) disposed thereon about which a wheel 90 (partially shown) of the wheel assembly 46 is rotatable. The wheel 90 is secured by a spline or other suitable means to a drive shaft 96 which is disposed within the spindle portion 88 and is rotatable within a bearing 100 located therein. The drive shaft 96 and the axle shaft 36 are rotatably secured together by a universal joint assembly 98 located within the ball portion 48. The pivotal axes of the universal joint 98 and the ball portion 48 and socket 50 are coincident.

The universal joint assembly 98 can be of the conventional cross type or the constant velocity type. In the preferred embodiment the constant velocity type joint is used to prevent excessive rotational speed fluctuations due to the variations in the combined steering and suspension angles at this joint.

The lower portion of the steering knuckle member 52 terminates in an arm 102 (FIGURE 2) which is attached to a steering linkage assembly generally designated by the numeral 104, which is in turn connected to a steering gear (not shown) whereby the wheel assembly 46 can be pivoted about a substantially vertical axis determined by the steering knuckle assembly 49 thus allowing the vehicle to be steered.

As can be seen the ball joint assembly (FIGURE 3) comprising the ball portion 48 and the socket member 51 allow the wheel assembly 46 to pivot about a substantially horizontal axis (extending into the plane of the paper of the drawings) during jounce and rebound travel, while the bearings 53 and 54 and the corresponding pin members 57 and 59 allow the steering knuckle member 52 to traverse about a vertical axis during steering of the wheel assembly 46. Note that with the construction as shown and as described, the axle housing member 20 and 22 act as lower control arms while providing protection for the associated axle shafts. This latter feature is important since many four-wheel drive vehicles are used in off-the-road service. With the axle housing used as the lower control arm, the height of the center of gravity of the vehicle can be lowered in comparison to a similar vehicle having a lower control arm independent of the axle housing for the same road clearance.

As shown in FIGURE 1 and as previously described, the socket member 51 is of a two-piece construction which is bolted together; in a modified construction shown in FIGURES 4 and 5 a one-piece socket member 51a can be utilized. Looking now to FIGURE 4, the one-piece socket member 51a is constructed with an aperture which is initially formed of upper and lower vertically spaced or opposed flat or planar axially extending surfaces 120 and generally circularly shaped, axially extending surfaces 122 disposed on horizontally opposite sides thereof and joining the upper and lower generally flat extending surfaces 120. Spherical seats 124 are then subsequently machined or otherwise formed in the flat surface portions 120. The spherical seats 124 are constructed to have a diameter substantially equal to the diameter of the ball portion disposed at the end of the axle housing member 20; likewise, the circular portions 122 are formed of an arc which has a diameter substantially equal to the diameter of the ball at the end of the axle housing 20. A modified partially spherically shaped ball portion 48a is provided with flat, planar, vertically extending surfaces 126 on opposite, horizontally spaced portions of the ball 48a. The flat surfaces 126 are of a length substantially equal to that of the flat surfaces 120 while the remaining spherical portion is of an extent comparative to the circular surfaces 122 such that both the ball 48a and the aperture define substantially congruent profiles. In assembling, the modified socket portion 51a to the modified ball portion 48a, the socket portion 51a is rotated to a position 90° from that as shown in FIGURE 4 such that the flat side portions 126 on the ball 48a are in alignment with the upper and lower flat portions 120. In this position the remaining spherical portion of the modified ball portion 48a can pass axially through the circularly shaped side portions 122 since they are of equal diameters. With the socket member 51a thus positioned about the ball portion 48a, the socket portion 51a is rotated 90° such that the spherical seats 124 defined in the flat portions 120 are in engagement then with the remaining spherical portion of the ball portion 48a, and at the same time the flat portions 126 of ball 42a are then confronting the circular portions 122 (FIGURE 5). With this arrangement then the socket portion 51a is axially locked to the ball 48a and can be rotated about a horizontal axis to accommodate jounce and rebound travel of wheel assembly 46. With such a structure, a one-piece socket member 51a can be utilized, thus providing for a simplified assembly.

Velocity sensitive means are provided to impede the jounce and rebound travel of the wheel assembly 46. Looking now to FIGURES 1 and 3, a shock absorber 106 is connected between the outer end of the lower control arm or axle housing member 20 and thence to a shock tower 108 secured to the frame rail 14. The load or force taken by the shock absorber 106 is a function of the relative velocity at which its parts are telescoped inwardly or outwardly. Dynamic vertical road loads occurring at the wheel assembly 46 are transmitted to and reacted by shock absorber 106 via the steering knuckle assembly 49 and the lower control arm or axle housing member 20. A jounce bumper 107 of rubber or similar material is connected to the bottom of the shock tower 108 and prevents metal-to-metal contact in a maximum jounce condition.

In the embodiment previously described, frictional forces have been minimized in the steering of the wheels but still maintained in the movement of the wheels into jounce and rebound. In the modification shown in FIGURES 6 and 7, this latter frictional force has been minimized. Looking now then to FIGURE 6, the steering knuckle assembly is indicated by the numeral 49b and includes a steering knuckle member 52b. The steering knuckle member 52b is similar in construction to the steering knuckle member 52 previously described, and is connected to an upper control arm and lower control arm assembly in a similar manner which need not be repeated here. Likewise, the axle housing member 20b, and the ball portion 48b are similar in construction to the axle housing member 20 and ball portion 48. The steering knuckle member 52b is rotatably secured to a one-piece ring member 51b in the same manner that knuckle member 52 is secured to socket member 51. A pair of bearings 130 have their outer races fixedly secured to opposite horizontally spaced ends of the ball portion 48b. The ring member 51b is provided with a pair of aligned apertures 132 extending through which are a pair of pins or shafts 134 which are rotatably secured within the inner races of the bearings 130. With the construction as shown in FIGURES 6 and 7 as the wheel assembly 46 moves in jounce and rebound, the steering knuckle member 52b is free to rotate about a substantially horizontal axis extending through the pins 134 and the bearings 130. Thus the frictional forces between the ball and socket have been substantially minimized.

Note that with the torsion bar loads reacted by the upper control arm, the loads on the bearings in either embodiment are minimized.

Thus in the suspension system just described, an independent front suspension for a front wheel or four-wheel drive type vehicle has been shown having a construction utilizing only a single pivot joint and a single universal joint in the axle assembly; with this construction, the need for a slip joint in the axle shafts is obviated. In this suspension the axle housing, which protects the axle shaft, is used as a lower control arm, thereby allowing the vehicle to be lower while still maintaining adequate ground clearance. A construction has been shown in which a lower control arm of maximum length is provided utilizing a centrally located pivot joint. The advantage of a longer control arm is that it facilitates a reduction in tire scrub thereby allowing the roll center of the vehicle to be raised, to provide greater stability in roll while maintaining the amount of tire scrub at an acceptable level. Finally, the suspension design as shown and described herein, provides means whereby friction is minimized in steering and in which friction is minimized in jounce and rebound travel.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. An independent suspension system having wheels for driving and steering a vehicle comprising an axle assembly including a pair of axle housing members pivotally secured to each other, a pair of steering knuckle assemblies, each of said steering knuckle assemblies comprising a ring member pivotably secured to an outer end portion of one of said pair of axle housing members for pivotable movement about a plurality of axes, a steering knuckle member rotatable about a substantially vertical axis relative to said ring member, and anti-friction means disposed between said steering knuckle member and said ring member for rotatably connecting said steering knuckle member to said ring member, each of a pair of wheel assemblies rotatably secured to each said steering knuckle member of said pair of steering knuckle assemblies, control arm means pivotally connected to said each of said steering knuckle assemblies and pivotally connected to the vehicle chassis for guiding said steering knuckle assemblies in up-and-down swinging motion, spring means operatively connected to said control arm means and to the vehicle chassis for resiliently resisting said up-and-down swinging motion, means including said axle assembly for transmitting power to said wheel assemblies and steering means including said steering knuckle assemblies for steering said wheel assemblies.

2. An independent suspension system having wheels for driving and steering a vehicle comprising an axle assembly including a pair of axle housing members pivotably secured to each other along an axis substantially centrally disposed of said axle assembly, a pair of steering knuckle assemblies, each of said steering knuckle assemblies comprising a ring member pivotably secured to an outer end portion of one of said pair of axle housing members for pivotal movement about a plurality of axes, a steering knuckle member rotatable about a substantially vertical axis relative to said ring member, and anti-friction means disposed between said steering knuckle member and said ring member for rotatably connecting said steering knuckle member to said ring member, each of a pair of wheel assemblies rotatably secured to each said steering knuckle member of said pair of steering knuckle assemblies, control arm means pivotally connected to said each of said steering knuckle assemblies and pivotally connected to the vehicle chassis for guiding said steering knuckle assemblies in up-and-down swinging motion, spring means operatively connected to said control arm means and to the vehicle chassis for resiliently resisting said up-and-down swinging motion, means including said axle assembly for transmitting power to said wheel assemblies and steering means including said steering knuckle assemblies for steering said wheel assemblies.

3. An independent suspension system having wheels for driving and steering a vehicle, comprising an axle assembly including a pair of axle housing members pivotally secured to each other along an axis substantially centrally disposed of said axle assembly, and a pair of axle shafts disposed within said pair of axle housing members and rotatably and pivotally secured to each other at a point substantially on said axis, a pair of steering knuckle assemblies each comprising a ring member pivotably secured to an outer end portion of one of said axle housing members for pivotable movement about a plurality of axes, a steering knuckle member rotatable about a substantially vertical axis relative to said ring member, anti-friction means disposed between said steering knuckle member and said ring member for rotatably connecting said steering knuckle member to said ring member, each of a pair of wheel assemblies rotatably secured to each said steering knuckle member of said pair of steering knuckle assemblies, control arm means pivotally connected to said each of said steering knuckle assemblies and pivotally connected to the vehicle chassis for guiding said steering knuckle assemblies in up-and-down swinging motion, spring means operatively connected to said control arm means and to the vehicle chassis for resiliently resisting said up-and-down swinging motion, means including said axle assembly for transmitting power to said wheel assemblies and steering means including said steering knuckle assemblies for steering said wheel assemblies.

4. An independent suspension system having wheels for driving and steering a vehicle comprising an axle assembly including a pair of axle housing members pivotably secured to each other along an axis substantially centrally disposed of said axle assembly, each of said axle housing members terminating in a ball portion at its outer extremity and being pivotably secured to each other at a point substantially on said axis, each of a pair of steering knuckle assemblies being individual to one of said pair of axle housing members and each comprising a socket member defining a socket for matably receiving and for thereby being pivotably secured to said ball portion of said one of said pair of axle housing members, a steering knuckle member rotatable about a substantially vertical axis relative to said socket member, and anti-friction means disposed between said steering knuckle member and said socket member for rotatably connecting said steering knuckle member to said socket member, a pair of wheel assemblies each rotatably secured to one said steering knuckle member of said pair of steering knuckle assemblies, control arm means pivotally connected to said each of said steering knuckle assemblies and pivotally connected to the vehicle chassis for guiding said steering knuckle assemblies in up-and-down swinging motion, spring means operatively connected to said control arm means and to the vehicle chassis for resiliently resisting said up-and-down swinging motion, means including said axle assembly for transmitting power to said wheel assemblies and steering means including said steering knuckle assemblies for steering said wheel assemblies.

5. An independent suspension system having wheels for driving and steering a vehicle comprising an axle assembly including a first and a second axle housing member pivotably secured to each other along an axis substantially centrally disposed of said axle assembly, a differential assembly disposed in said first axle housing member, a first axle shaft rotatably disposed in said first axle housing member and connected to one side of said differential assembly and extending centrally toward said axis, a second axle shaft rotatably disposed in said second axle housing member and rotatably and pivotably secured to said first axle shaft at a point substantially on said axis, and another axle shaft rotatably disposed in said first axle housing and connected to the other side of said differential assembly and extending away from said axis; a pair of steering knuckle assemblies each comprising a ring member pivotably secured to an outer end portion of one of said first and said second axle housing members, a steering knuckle member rotatable about a substantially vertical axis relative to said ring member, and anti-friction means disposed between said steering knuckle member and said ring member for rotatably connecting said steering knuckle member to said ring member; each of a pair of wheel assemblies rotatably secured to each said steering knuckle member of said pair of steering knuckle assemblies; control arm means pivotally connected to said each of said steering knuckle assemblies and pivotally connected to the vehicle chassis for guiding said steering knuckle assemblies in up-and-down swinging motion, spring means operatively connected to said control arm means and to the vehicle chassis for resiliently resisting said up-and-down swinging motion, means including said axle assembly for transmitting power to said wheel assemblies and steering means including said steering knuckle assemblies for steering said wheel assemblies.

6. An independent suspension system having wheels for steering and driving a vehicle comprising an axle assembly including a pair of axle housing members pivotably secured to each other along an axis substantially centrally disposed of said axle assembly, and a pair of axle shafts disposed within said pair of axle housing members and rotatably and pivotably secured to each other at a point substantially on said axis, a pair of steering knuckle assemblies each comprising a ring member pivotably secured to an outer end portion of one of said axle housing members, a steering knuckle member rotatable about a substantially vertical axis relative to said ring member, and anti-friction means disposed between said steering knuckle member and said ring member for rotatably connecting said steering knuckle member to said ring member, a pair of upper control arms each having one end pivotably secured to the vehicle chassis and the other end pivotably secured to one said steering knuckle member of said pair of steering knuckle assemblies, a spring member connected between each of said upper control arms and the vehicle chassis, each of a pair of wheel assemblies rotatably secured to each said steering knuckle member of said pair of steering knuckle assemblies, means including said axle assembly for transmitting power to said wheel assemblies and steering means including said steering knuckle assemblies for steering said wheel assemblies.

7. An independent suspension system having wheels for driving and steering a vehicle comprising an axle assembly including a pair of axle housing members pivotably secured to each other along an axis substantially centrally disposed of said axle assembly, and a pair of axle shafts disposed within said pair of axle housing members and rotatably and pivotably secured to each other at a point substantially on said axis, a pair of steering knuckle assemblies each comprising a ring member pivotably secured to an outer end portion of one of said axle housing members, a steering knuckle member rotatable about a substantially vertical axis relative to said ring member, and anti-friction means disposed between said steering knuckle member and said ring member for rotatably connecting said steering knuckle member to said ring member, a pair of upper control arms each having one end pivotably secured to the vehicle chassis and the other end pivotably secured to one said steering knuckle member of said pair of steering knuckle assemblies, a spring member connected between each of said upper control arms and the chassis of the vehicle, each of a pair of shock absorbers connected between one of said pair of axle housing members and the vehicle chassis, a pair of wheel assemblies each rotatably secured to one said steering knuckle member of said pair of steering knuckle assemblies, means including said axle assembly for transmitting power to said wheel assemblies and steering means including said steering knuckle assemblies for steering said wheel assemblies.

8. An independent suspension system having wheels for driving and steering a vehicle comprising an axle assembly including a pair of axle housing members pivotably secured to each other, a pair of steering knuckle assemblies each comprising a ring member rotatable about a substantially horizontal axis relative to an outer end portion of one of said axle housing members, anti-friction means disposed between said outer end portion of said one of said axle housing members and said ring member for rotatably connecting said ring member to said outer end portion, a steering knuckle member rotatable about a substantially vertical axis relative to said ring member, and anti-friction means disposed between said steering knuckle member and said ring member for rotatably connecting said steering knuckle member to said ring member, a pair of wheel assemblies each rotatably secured to one said steering knuckle member of said pair of steering knuckle assemblies, control arm means pivotally connected to said each of said steering knuckle assemblies and pivotally connected to the vehicle chassis for guiding said steering knuckle assemblies in up-and-down swinging motion, spring means operatively connected to said control arm means and to the vehicle chassis for resiliently resisting said up-and-down swinging motion, means including said axle assemblies for transmitting power to said wheel assemblies and steering means including said steering knuckle assemblies for steering said wheel assemblies.

9. An independent suspension system having wheels for driving and steering a vehicle comprising an axle assembly including a pair of axle housing members pivotably secured to each other along an axis, each of said axle housing members terminating in a ball portion at its outer extremity, each said ball portion having a generally spherical contour with a pair of diametrically disposed flat face portions lying in parallel, substantially vertical planes, each of a pair of steering knuckle assemblies being individual to one of said pair of axle housing members and each comprising a one-piece socket member having a socket for matably receiving and for being pivotably secured to said ball portion of said one of said axle housing members, said socket having a pair of diametrically substantially vertically opposed spherically contoured surfaces having a diameter substantially equal to the diameter of the spherical portion of said ball portion and having substantially horizontally opposed arcuate, cylindrical surface portions having an arc of a diameter substantially equal to the diameter of said spherical portion of said ball portion, said socket member being assembled upon said ball portion with said spherical surfaces in frictional engagement with said spherical portion of said ball portion, each of said pair of steering knuckle assemblies further comprising a steering knuckle member rotatable about a substantially vertical axis relative to said socket member, and anti-friction means disposed between said steering knuckle member and said socket member for rotatably connecting said steering knuckle member to said socket member, a pair of wheel assemblies each rotatably secured to one said steering knuckle member of said pair of steering knuckle assemblies, control arm means pivotally connected to said each of said steering knuckle assemblies and pivotally connected to the vehicle chassis for guiding said steering knuckle assemblies in up-and-down swinging motion, spring means operatively connected to said control arm means and to the vehicle chassis for resiliently resisting said up-and-down swinging motion, means including said axle assembly for transmitting power to said wheel assemblies and steering means including said steering knuckle assemblies for said wheel assemblies.

10. A suspension system for a wheeled vehicle comprising a lower control arm member extending transversely of the vehicle and pivotally connected at its inner end to the vehicle chassis, a steering knuckle assembly comprising a ring member pivotably secured to an outer end portion of said lower control arm member for pivotable movement about a plurality of axes, a steering knuckle member rotatable about a substantially vertical axis relative to said ring member, anti-friction means disposed between said steering knuckle member and said ring member for rotatably connecting said steering knuckle member to said ring member, upper control arm means pivotally connected to said steering knuckle assembly and pivotally connected to the vehicle chassis and operative with said lower control arm member for guiding said steering knuckle assembly in up-and-down swinging motion, spring means operatively connected from one of said upper control arm means and said lower control arm member to the vehicle chassis for resiliently resisting said up-and-down swinging motion, and wheel means rotatably secured to said steering knuckle member.

11. A suspension system for a wheeled vehicle comprising a lower control arm member extending transversely of the vehicle and pivotally connected at its inner end to the vehicle chassis and terminating in a ball portion at its outer extremity, a steering knuckle assembly comprising a socket member having a socket for matably receiving and for being pivotably secured to said ball portion of said lower control arm member, a steering knuckle member rotatable about a substantially vertical axis relative to said socket member, anti-friction means disposed between said steering knuckle member and said socket member for rotatably connecting said steering knuckle member to said socket member, upper control arm means pivotally connected to said steering knuckle assembly and pivotally connected to the vehicle chassis and operative with said lower control arm member for guiding said steering knuckle assembly in up-and-down swinging motion, spring means operatively connected from one of said upper control arm means and said lower control arm member to the vehicle chassis for resiliently resisting said up-and-down swinging motion, and a wheel assembly rotatably secured to said steering knuckle member.

12. The suspension system of claim 11 in which said anti-friction means comprises a pair of bearing members diametrically oppositely secured to said socket member along said vertical axis, and with said steering knuckle assembly further including a pair of pin members secured to said steering knuckle member at opposite extremities substantially along said vertical axis and each being rotatably secured to one of said bearing members.

13. A suspension system for a wheeled vehicle comprising a lower control arm extending substantially transversely of the vehicle and pivotally connected at its inner end to the vehicle chassis, a steering knuckle assembly comprising a ring member pivotable relative to an outer end portion of said lower control arm member about a substantially horizontal axis, first anti-friction means disposed between said ring member and said outer end portion of said lower control arm member for pivotably connecting said ring member to said end portion of said lower control arm member for movement about said horizontal axis, a steering knuckle member rotatable relative to said ring member about a substantially vertical axis, second anti-friction means disposed between said steering knuckle member and said ring member for rotatably connecting said steering knuckle member to said ring member for rotation about said vertical axis, upper control arm means pivotally connected to said steering knuckle assembly and pivotally connected to the vehicle chassis and operative with said lower control arm member for guiding said steering knuckle assembly in up-and-down swinging motion, spring means operatively connected from one of said upper control arm means and said lower control arm member to the vehicle chassis for resiliently resisting said up-and-down swinging motion, and a wheel assembly rotatably secured to said steering knuckle member.

14. The suspension system of claim 13 in which said first anti-friction means comprises a first pair of spaced bearing members oppositely secured to said outer end portion of said lower control arm member along said horizontal axis, said second anti-friction means comprises a second pair of spaced bearing members oppositely secured to said ring member along said vertical axis, and with said steering knuckle assembly further including a first pair of spaced pin members secured to said ring member along said horizontal axis and being rotatably secured to said first pair of bearing members, and a second pair of spaced pin members secured to said steering knuckle member along said vertical axis and being rotatably secured to said second pair of bearing members.

15. A suspension system for a wheeled vehicle comprising a lower control arm member extending substantially transversely of the vehicle and pivotally connected at its inner end to the vehicle chassis, said lower control arm member terminating in a ball portion at its outer extremity, said ball portion having a generally spherical contour with a pair of diametrically disposed flat face portions lying in parallel substantially vertical planes, a steering knuckle assembly comprising a one-piece socket member having a socket for matably receiving and for being pivotably secured to said ball portion, said socket having a pair of diametrically substantially vertically opposed spherically contoured surfaces having a diameter substantially equal to the diameter of the spherical portion of said ball portion and having substantially horizontally opposed arcuate, cylindrical surface portions having an arc of a diameter substantially equal to the diameter of said spherical portion of said ball portion, said socket member being assembled upon said ball portion with said spherical surfaces in frictional engagement with said spherical portion of said ball portion, said steering knuckle assembly further comprising a steering knuckle member rotatable about a substantially vertical axis relative to said socket member, and anti-friction means disposed between said steering knuckle member and said socket member for rotatably connecting said steering knuckle member to said socket member, upper control arm means connected to said steering knuckle and to the vehicle chassis and operative with said lower control arm member for controlling the up-and-down swinging motion of said steering knuckle, spring means connected between one of said upper control arm means and said lower control arm member for resisting said up-and-down swinging motion, and a wheel assembly rotatably secured to said steering knuckle member.

16. A suspension system for a wheeled vehicle comprising: a control arm extending substantially transversely of the vehicle, said control arm terminating in a ball portion at its outer extremity, said ball portion having a generally spherical contour with a pair of diametrically disposed flat faced portions lying in parallel planes, a steering knuckle assembly comprising a one-piece socket member having a socket for matably receiving and for being pivotably secured to said ball portion, said socket having a pair of diametrically opposed, spherically contoured surfaces having a diameter substantially equal to the diameter of the spherical portion of said ball portion and having diametrically opposed, arcuate, cylindrical surface portions located substantially in quadrature relative to said spherically contoured surfaces and having an arc of a diameter substantially equal to the diameter of said spherical portion of said ball portion, said socket member being assembled upon said ball portion with said spherical surfaces in frictional engagement with said spherical portion of said ball portion, said steering knuckle assembly further comprising a steering knuckle member rotatable about a substantially vertical axis relative to said socket member, control arm means connected to said steering knuckle assembly and to the vehicle chassis for guiding it in up-and-down swinging motion, spring means operatively connected to said control arm means and to the vehicle chassis for resiliently resisting said up-and-down swinging motion, and a wheel assembly rotatably secured to said steering knuckle member.

References Cited by the Examiner

UNITED STATES PATENTS

| | | | |
|---|---|---|---|
| 2,417,325 | 3/47 | Roos | 180—73 |
| 2,477,090 | 7/49 | Roeder et al. | 180—43 |
| 2,494,324 | 1/50 | Wright | 180—46 |
| 2,737,791 | 3/56 | Dillman et al. | 180—43 |
| 2,968,358 | 1/61 | De Lorean | 180—73 X |
| 3,042,133 | 7/62 | Ordorica | 180—43 |
| 3,075,600 | 1/63 | Ordorica | 180—43 |

FOREIGN PATENTS

| | | |
|---|---|---|
| 510,455 | 8/39 | Great Britain. |
| 631,905 | 11/49 | Great Britain. |
| 875,503 | 6/42 | France. |

A. HARRY LEVY, *Primary Examiner.*

PHILIP ARNOLD, *Examiner.*

UNITED STATES PATENT OFFICE
CERTIFICATE OF CORRECTION

Patent No. 3,162,262                              December 22, 1964

Miguel A. Ordorica et al.

It is hereby certified that error appears in the above numbered patent requiring correction and that the said Letters Patent should read as corrected below.

Column 11, line 41, after "for" insert -- steering --.

Signed and sealed this 3rd day of August 1965.

(SEAL)
Attest:

ERNEST W. SWIDER
Attesting Officer

EDWARD J. BRENNER
Commissioner of Patents